F. KISH.
AGRICULTURAL IMPLEMENT.
APPLICATION FILED SEPT. 17, 1917.

1,295,525.

Patented Feb. 25, 1919.

Inventor
Frank Kish

By his Attorney

UNITED STATES PATENT OFFICE.

FRANK KISH, OF CLEVELAND, OHIO.

AGRICULTURAL IMPLEMENT.

1,295,525.

Specification of Letters Patent.   Patented Feb. 25, 1919.

Application filed September 17, 1917.   Serial No. 191,739.

*To all whom it may concern:*

Be it known that I, FRANK KISH, a subject of the King of Hungary, resident of Cleveland, county of Cuyahoga, and State of Ohio, have invented certain new and useful Improvements in Agricultural Implements, of which the following is a specification.

This invention relates to improvements in agricultural implements.

The principal object of the invention is to provide a motor driven machine combined with a plurality of implements adapted to prepare the soil by forming furrows in parallel rows, depositing seeds from a reservoir carried by the machine, and finally, to press the soil firmly over the seed.

A further object is to provide means combined with the machine whereby furrows of any desired depth may be made and also means for raising or lowering the plows at the will of the operator.

These and other like objects are attained by the novel construction and combination of parts hereafter described and shown in the accompanying drawings, forming a material part of this disclosure, and in which:—

Figure 1:
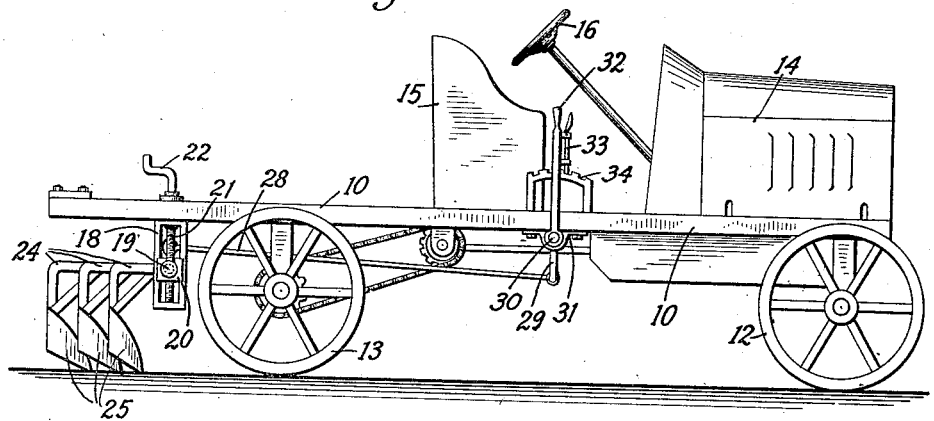
Figure 1 is a side elevational view of an implement made in accordance with the invention.
Figure 2:
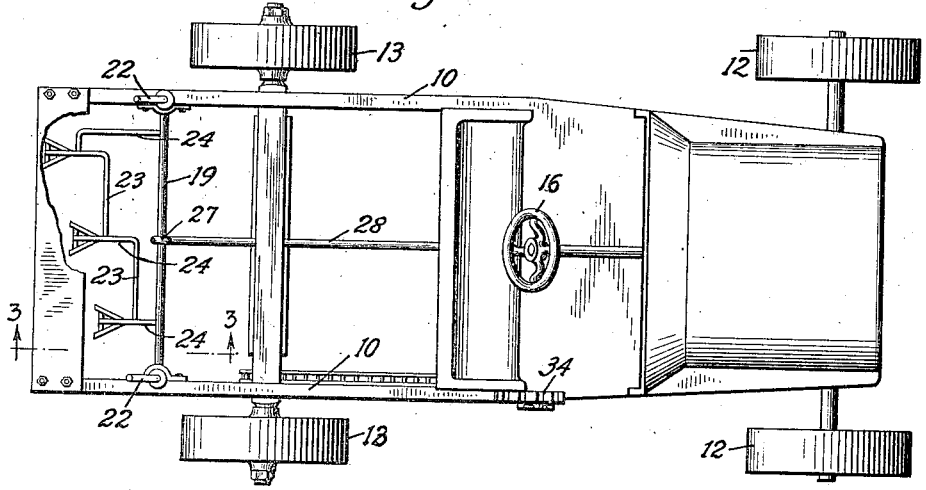
Fig. 2 is a top plan view of the same.
Figure 3:
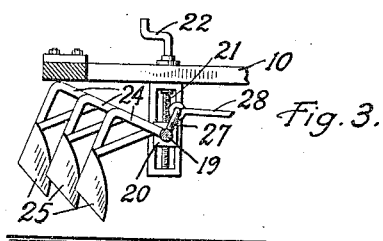
Fig. 3 is an enlarged vertical sectional view taken on line 3—3 of Fig. 2.

In carrying out the invention, use is made of a conventional form of automobile truck, comprised of side frames 10, resting at the rear upon driving wheels 13, and at the front upon the dirigible wheels 12, the truck being provided with any preferred form of motor 14, driver's seat 15, and steering wheel 16 by means of which the truck may be maneuvered as desired.

Near the rear end of the truck to the side frame is a pair of downwardly extending brackets 18 upon opposite sides and in which are slidably mounted blocks 20, the same being movable by means of screws 21, provided with operating screw threaded rods, provided with cranked handles 22 for turning the same, and by means of which the blocks may be raised or lowered.

Rotatably mounted in the blocks 20 is a shaft 19 to which are firmly secured cultivator beams 24, the same extending outwardly to different distances connected by bars 23, and then bent downwardly, their lower ends being rigidly engaged to plows 25, so that by operating the handles 22, the plows may be raised or lowered relative to the surface over which the wheels are passing, thus permitting furrows or trenches to be dug in the soil at any desired depth.

In order to raise the plows out of contact with the soil, the shaft 19 has affixed to it a rigid looped element 27, connected by the rod 28 with the lower end of a lever 29, fulcrumed upon the pin 30, in the bracket 31, secured to the lower side of the frame 10, the upper end of the lever 29 terminating in a handle 32, convenient of access by a person occupying the seat 15, so that by pushing the same forward, the plows are raised from the soil, the lever being held in an adjusted position by the detent 33 engaging in the toothed segment 34 secured above the bracket 31 to the frame side.

From the foregoing, it will be seen that a plurality of plow points carried by the frame may be adjusted as to a desirable working depth.

Having thus described my invention what I claim as new and desire to secure by Letters Patent, is:—

In an agricultural implement of the character described, the combination with a frame, and a pair of brackets depending from the sides thereof, blocks slidably mounted in said brackets, screw threaded rods for moving said blocks, cranked handles on said rods for turning the same, a bar rotatably mounted in said blocks, outwardly extending cultivator beams secured to said bar, horizontal rods connecting said cultivator beams, at different distances from the first named bar, plows secured to the lower ends of said downwardly bent cultivator beams, an operating lever, a rigid looped element on said bar connected to said operating lever, and means for holding said lever in its adjusted position.

In testimony whereof I have affixed my signature.

FRANK KISH.

Copies of this patent may be obtained for five cents each, by addressing the "Commissioner of Patents, Washington, D. C."